US007406507B2

(12) United States Patent
Piccioni

(10) Patent No.: US 7,406,507 B2
(45) Date of Patent: Jul. 29, 2008

(54) METHOD AND SYSTEM FOR SITUATION TRACKING AND NOTIFICATION

(76) Inventor: Robert L. Piccioni, 1009 Paintbrush Dr., Mesquite, TX (US) 75149

( * ) Notice: Subject to any disclaimer, the term of this patent is extended or adjusted under 35 U.S.C. 154(b) by 196 days.

(21) Appl. No.: 11/012,370

(22) Filed: Dec. 15, 2004

(65) Prior Publication Data

US 2005/0143099 A1 Jun. 30, 2005

Related U.S. Application Data

(63) Continuation of application No. 09/590,502, filed on Jun. 9, 2000, now Pat. No. 6,842,774.

(51) Int. Cl.
*G06F 15/16* (2006.01)

(52) U.S. Cl. ....................... 709/207; 709/201; 709/246; 340/825.36; 379/49

(58) Field of Classification Search ................. 709/202, 709/203, 206, 207, 201, 246; 705/12; 379/69, 379/49; 340/825.36
See application file for complete search history.

(56) References Cited

U.S. PATENT DOCUMENTS

| | | | | |
|---|---|---|---|---|
| 5,510,978 | A * | 4/1996 | Colgan | 705/12 |
| 5,893,091 | A * | 4/1999 | Hunt et al. | 709/206 |
| 5,912,947 | A * | 6/1999 | Langsenkamp et al. | 379/69 |
| 6,173,284 | B1 * | 1/2001 | Brown | 709/203 |

* cited by examiner

*Primary Examiner*—Paul H Kang

(57) ABSTRACT

Alerts (13) are generated at mobile entity devices (12) and servers (16). The alerts are examined at the servers and handled by the server and/or forwarded to a clearing house (22). At the clearing house, emergency events (40) are created in response to the alerts by an event module (36). A notify module (38) compares events to an information need (304) associated with a subscriber profile (46) to determine whether a subscriber associated with the subscriber profile should be notified about events. The notify module also handles interactive search requests from a client (20) for the events.

18 Claims, 4 Drawing Sheets

METHOD AND SYSTEM FOR SITUATION TRACKING AND NOTIFICATION

RELATED APPLICATIONS

This application is a continuation of U.S. patent application Ser. No. 09/590,502, filed Jun. 9, 2000 now U.S. Pat. No. 6,842,774, by Robert L. Piccioni, and entitled, "METHOD AND SYSTEM FOR SITUATION TRACKING AND NOTIFICATION".

TECHNICAL FIELD OF THE INVENTION

This invention relates in general to data processing, and, more particularly, to a method and system for situation tracking and notification.

BACKGROUND OF THE INVENTION

As computers have grown increasingly important in today's society, information tracking and distribution has grown increasingly useful in many industries. Law enforcement is one such industry. Law enforcement has successfully used computer systems for tracking information about criminals. However, existing law enforcement computer systems have typically been limited to crime information. Further, existing methods lack effective capabilities to share information with other law enforcement departments and non-law enforcement personnel.

SUMMARY OF THE INVENTION

One aspect of the invention is a method for situation tracking comprising receiving an alert at a clearing house and handling an emergency event based on the alert. The method further includes generating a notification in response to a subscriber profile and the event and determining a destination for the notification based on the subscriber profile.

The present invention provides a number of technical advantages. One such technical advantage is having the capability for tracking weather, crime, emergency, traffic related and other situations to the media, public, law enforcement personnel, emergency personnel and others. Another such technical advantage is the capability to support the updating and creation of emergency situation events in response to alerts generated by mobile entity devices and other servers. Events may be then be searched and notifications sent to interested subscribers based on profiles associated with the subscribers. A further technical advantage is the capability for controlling access to emergency situation events based on the type of entity or person accessing the situation events and to provide controlled access to events over the Internet.

BRIEF DESCRIPTION OF THE DRAWINGS

A better understanding of the present invention will be realized from the detailed description which follows, taking in conjunction with accompanying drawings, in which.

DETAILED DESCRIPTION OF THE INVENTION

Figure 1:
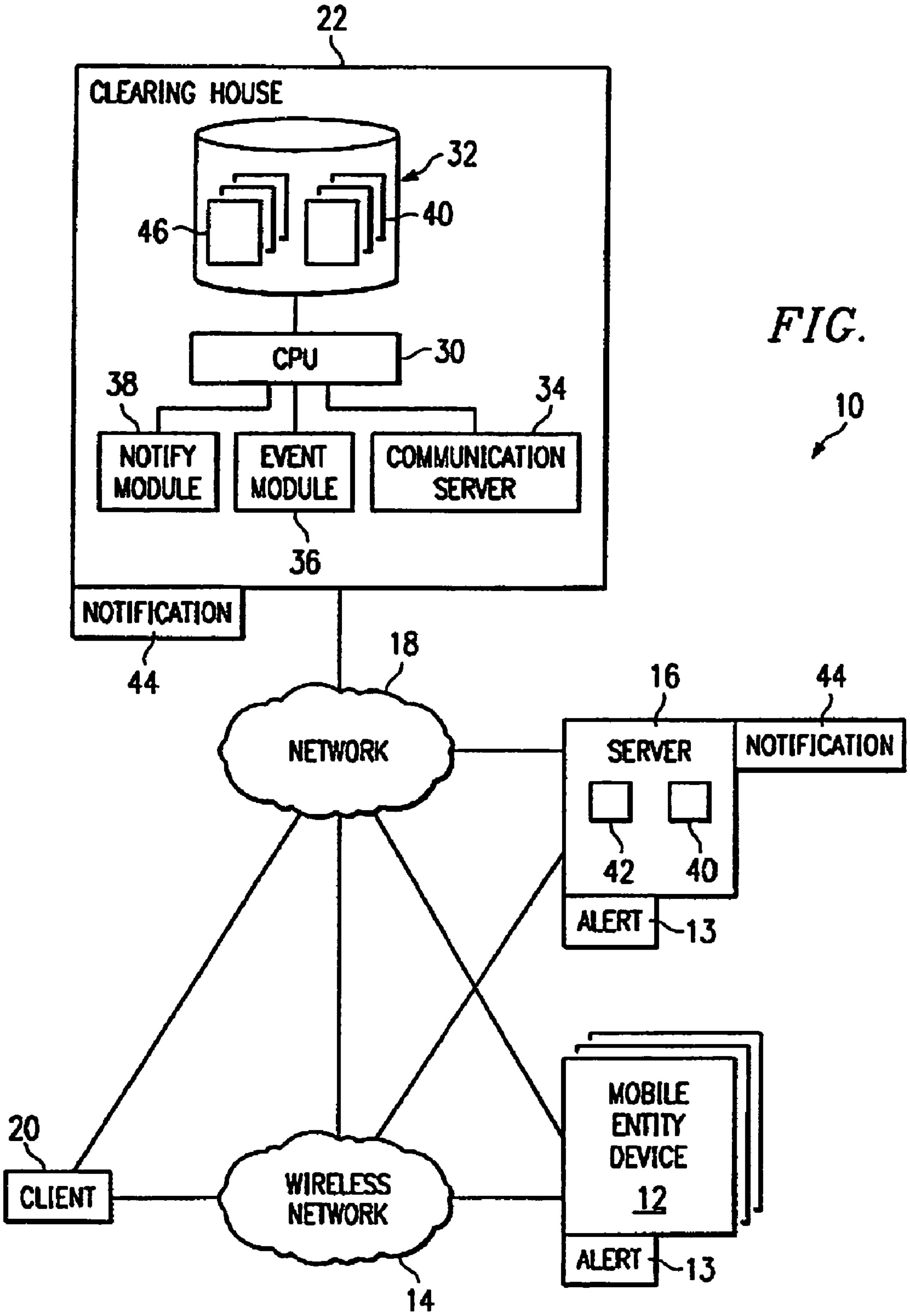
FIG. 1 illustrates a situation tracking system for notification of others regarding various situations.

FIG. 1 illustrates a notification system 10 usable by law enforcement officials or other agencies for rapid notification of others regarding various public safety events. Notification system 10 comprises a mobile entity device 12, a plurality of public safety alerts 13, a wireless network 14, a server 16, a network 18, a client 20 and a clearing house 22. Notification system 10 is operable to provide the capability for tracking weather, crime, emergency, traffic related and other situations to the media, public, law enforcement personnel, emergency personnel and others. System 10 supports the updating and creation of public safety events in response to alerts generated by mobile entity devices 12 and servers 16. Events may be then be searched and notifications sent to interested subscribers based on profiles associated with the subscribers. Further, system 10 provides the capability for controlling access to public safety events based on the type of entity or person accessing the public safety events. Software associated with system 10 may be integrated with other software and hardware, or may stand alone.

Mobile entity device 12 comprises one or more input and/or output devices operable to send and receive data. More specifically, mobile entity device 12 may comprise a keyboard, a display, a scanner, a digital camera, other digital imaging products and an interface to network 14 and/or 18. For example, device 12 may comprise a PDA, handheld or other mobile computing device utilizing software such as the Motorola/SCA Mobile Data Product. Device 12 may be located in a police cruiser, an emergency vehicle, carried by an individual officer or emergency personnel, or in other suitable mobile locations. Device 12 may also be located at a fixed location such as a weather bureau office. A user of device 12 may comprise a law enforcement officer, emergency personnel, weather personnel and other suitable personnel.

Alerts 13 comprise information regarding occurrences and situations encountered by users of device 12. Alerts 13 are typically generated by the law enforcement officers, emergency personnel and weather personnel using devices 12. Alerts 13 may also be generated automatically by devices 12 in response to the configuration of devices 12 or by other entities. Alerts 13 may be generated in realtime.

Wireless network 14 comprises a wireless data communication system operable to communicate data between device 12, server 16, and network 18. For example, wireless network 14 may comprise a network utilizing Cellular Digital Packet Data (CDPD).

Server 16 comprises any general purpose or specialized computing device operable to communicate data using networks 14 and 18. Server 18 is operable to examine data received from mobile entity device 12 and clearing house 22. More specifically, server 16 may determine which data to pass on from device 12 to clearing house 22 and which data to pass from clearing house 22 to device 12. Server 16 may also comprise input and output devices for receiving information directly. For example, officer status information may be entered at server 16 instead of being received from device 12. Data may also be entered at a client or terminal associated with server 16. Server 16 is typically associated with a particular precinct, district, region, state or other geographic or organizational unit associated with law enforcement personnel, emergency services, weather bureaus and other suitable entities. For example, a server 16 may be associated with each precinct in a city, with the city as a whole, or in some other combination of precincts and cities. Server 16 may comprise a simple server for handling alerts 13 or a more powerful server for handling both alerts 13 and public safety events 40, similar to clearing house 22 (described below) and including similar or identical elements or data, to clearing house 22, such as, for example, criteria 42.

Network 18 comprises any suitable wireless or wireline data communications network for communicating between device 12, network 14, server 16, client 20 and clearing house 22. In the disclosed embodiment, network 18 comprises the Internet.

Client 20 comprises a general purpose or specialized computing system operable to receive information from a user. Client 20 may also comprise a web browser (not shown) operable to access clearing house 22 over networks 18 and 14.

Clearing house 22 comprises a central processing unit (CPU) 30 coupled to a computer readable storage device 32, a communication server 34, an event module 36, a notify module 38, one or more public safety events 40, criteria 42 and a plurality of subscriber profiles 46. CPU 30 comprises any suitable general purpose or specialized processor operable to execute applications stored on computer readable storage 32. Computer readable storage 32 may comprise magnetic storage, optical storage, random access memory (RAM), and other suitable transient and persistent storage devices in any combination. A portion of communication server 34 may comprise any suitable World Wide Web (WWW) server operable to handle hypertext transport protocol (HTTP) requests received from network 18. For example, Web server 34 may comprise the Apache web server or the Microsoft Internet Information Service (IIS). Portions of server 34 may also comprise interfaces operable to communicate with networks 14 and 18, and other suitable communications hardware and software.

Event module 36 comprises an executable software module operable to receive alert 13 from servers 16 and mobile devices 12. Event module 36 generates or updates an event 40 in response to one of alerts 13. Event 40 comprises a particular activity to be tracked at clearing house 22 and is described in more detail in association with FIG. 2.

Notify module 38 comprises an executable software module operable to generate notifications 44 regarding events 40 for communication to a subscriber of system 10. Notify module 38 is further operable to determine which events 40 to send to particular subscribers. A subscriber comprises a human user, organization, or class of users or organizations, which desire to receive information about events 40 from clearing house 22 and is described in more detail in FIG. 4. Notify module 38 may be further operable to publish events 40 and portions of events 40 to an Internet web site for public and/or restricted access. A particular subscriber profile 46 may be generated by an administrator associated with clearing house 22 to control which types 100 of events 40 and which portions of the events 40 are published to the Internet web site. Further, a particular subscriber profile 46 may be generated to correspond to a particular level of access to the Internet web site by a subscriber. For example, one profile 46 may be generated for media or public access portions of the web site, while another profile 46 may be generated for restricted police access portions of the web site.

Public safety events 40 comprise information related to situations and activities tracked by clearing house 22. For example, events 40 may track weather information, abducted/missing children and adults, prowler information, road construction, neighborhood watch information, traffic status information, chemical spills, cargo spills, sex offender information, officer status, vehicle location and health warnings. Events 40 may also be used to provide information regarding how to react in an emergency, such as a tornado.

Criteria 42 comprises rules and other directives at server 16 for handling alerts 13 received from devices 12 and generated by server 16. For example, based on the type of alert 13, criteria 42 may indicate that alert 13 be modified, discarded, forwarded to clearing house 22 or handled at server 16. Criteria 42 may be configured by an administrator (not shown) associated with server 16.

Notifications 44 comprise messages sent to entities interested in particular events 40. Notifications 44 may comprise electronic mail messages, alphanumeric pager pages, Internet web pages, facsimile transmissions, publishing data to one or more web pages, traditional mail and other methods for delivering information regarding events 40 to interested parties. Notifications 44 include accessible portions of events 40. In one embodiment, notifications 44 comprise an HTTP link to a web page associated with the event 40 associated with the notification 44.

Profiles 46 comprise information about subscribers using system 10. Profiles 46 may be created and updated manually by an administrator associated with clearing house 22 and may also be created automatically at clearing house 22 in response to information received from a subscriber or potential subscriber. For example, a subscriber may communicate with a web site associated with clearing house 22 using client 20 and fill out a subscription form at the web site to generate a profile 46 for that subscriber. Subscribers may comprise businesses, persons, police departments, cities and any other human or organizational entity individually or collectively. Each subscriber has an associated profile 46. System 10 may provide generic profiles 46 for anonymous users and/or classes of users. For example, an administrator associated with clearing house 22 may generate the generic profiles 46 manually. For another example, a generic profile 46 may be created for media personnel.

In operation, one or more alerts 13 are generated by devices 12 and communicated to server 16. Users of devices 12 generate alerts 13 to describe and update events 40. For example, an alert 13 may be generated at the scene of a burglary indicating the location of the house burglarized, evidence found at the scene and other information. For another example, an alert 13 may be generated automatically by a device 12 to indicate the current global positioning system (GPS) position, automatic vehicle locator (AVL) system position, or other vehicle location system position of a police cruiser associated with device 12 or be used to automatically indicate a location for an alert 13.

Alerts 13 generated by devices 12 may be received and examined at server 16. Server 16 uses criteria 42 to determine how to handle alerts 13. Criteria 42 may indicate that alert 13 is to be passed on to clearing house 22 and/or handled at server 16. Server 16 may examine various fields of alerts 13, such as those described in FIG. 3. Then, server 16 may analyze the fields against criteria 42. For example, criteria 42 may indicate that all officer status type alerts should be handled at server 16. For another example, criteria 42 may indicate that alerts 13 related to crimes are to be inspected at server 16 to add information from a related alert 13 or another source such as, for example, a data entry device at a police precinct office. Such information may include, for example, a text description of a suspect to accompany a photograph. The modified alert 13 may then be forwarded to clearing house 22. Alerts 13 may also be classified and sorted at server 16. For example, criteria 42 may indicate that a copy of all received alerts 13 is to maintained and sorted according to a geographic location associated with the alert 13.

Alerts handled at server 16 may be used to update events 40 handled by server 16. Criteria 42 may also cause the generation of further alerts 13 and one or more notifications 44 in response to the received alert 13. For example, criteria 42 may indicate that alerts 13 indicating the current position of police cruisers associated with server 16, such as when server 16 is associated with a particular precinct, are to be handled at server 16 to update events 40 tracking the location of police cruisers associated with server 16. For another example, criteria 42 may indicate that alerts 13 related to a national kidnapping event 40 should be passed on to clearing house 22. For yet another example, an alert 13 indicating a high-speed pursuit by a police cruiser may generate other alerts 13 as police units are deployed to form a road block. In general, criteria 42 may indicate any suitable action to be taken in response to particular alerts 13 as configured by an administrator associated with server 16.

Server 16 may also generate alerts 13 independently. For example, server 16 may generate an alert 13 indicating the arrest and detainment of a criminal associated with a national kidnapping event 40. For another example, server 16 may be associated with a weather bureau and generate an alert 13 indicating the location, direction and speed of a storm. Alerts 13 from server 16 are also processed according to criteria 42.

Clearing house 22 receives alerts 13 from servers 16 and may also receive alerts 13 directly from devices 12. Alerts 13 may be used to update events 40 supported by clearing house 22. More specifically, event module 36 examines the received alerts 13. Event module 36 may then update an existing event 40 or generate a new event 40 based on the received alert 13.

While event module 36 is processing alerts 13, notify module 38 determines whether to generate notifications 44 based on profiles 46. Notify module 38 may also generate search results in response to search requests from clients 20. More specifically, notify module 38 compares events 40 to profiles 46 to determine whether a notification 44 is to be generated for the subscriber (not shown) associated with the particular profile 46. For example, a particular profile 46 may indicate that the associated subscriber desires notifications 44 regarding events 40 associated murders in the state of Texas. For another example, a person who commutes daily or emergency personnel may have an associated profile 46 indicating a desire for notifications 44 regarding events 40 associated with road conditions in the Dallas area, such as accidents and construction. For yet another example, an aircraft pilot may desire notifications 46 regarding events 40 associated with weather conditions in the Austin area. In general, profiles 46 may indicate any suitable combination of information associated with events 40 for generating notifications 44 to subscribers. Notifications 44 may be communicated to clients 20 and devices 12 by communication server 34 over networks 14 and 18. Notify module 38 may determine which events 40 to publish to the Internet web site for access by web browsers on clients 20 based on a particular subscriber profile 46 where the Internet web site or an access level associated with the web site is the subscriber.

Communications server 34 may handle access to events 40 by clients 20 over networks 14 and 18. More specifically, the web server portion of server 34 may receive requests to view web pages associated with events 40 from clients 20. Server 34 examines the requests and determines if the subscriber associated with the request may access the requested web page based on profile 46 and the access levels associated with the event 40. Server 34 may then reply to the subscriber with the requested web page with the subscriber has access to the page, a portion of the requested web page when the subscriber has partial access to the web page or a failure message when the subscriber has no access to the requested web page. For example, a member of the media using either a custom profile 46 for the particular member or a generic "media" profile 46 may be allowed to access date, location information, and certain details associated with kidnapping events 40, but not other details such as the current location of the suspect. This selective access prevents the suspect from using this information against the police. In one embodiment, server 34 may generate web pages associated with events 40 such that all information associated with events 40 is available for unrestricted public access on the web site.

Client 20 may be used to access clearing house 22 by subscribers over network 18. For example, a web browser at client 20 may be used to perform a search of events 40 at clearing house 22.

Figure 2:
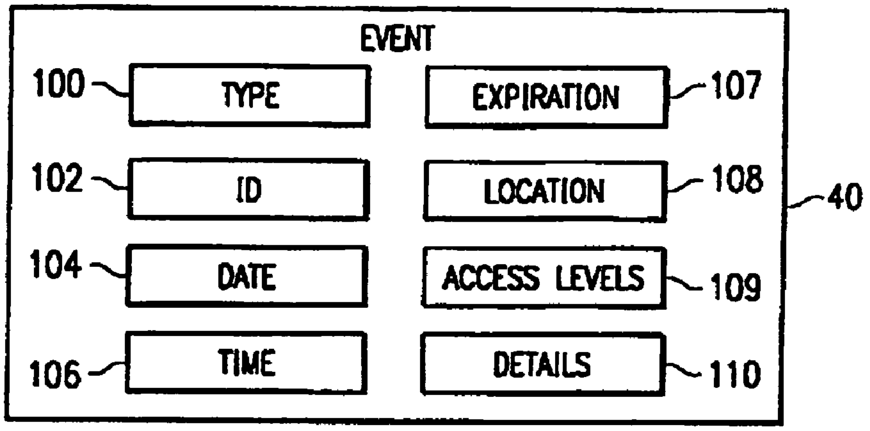
FIG. 2 is a block diagram illustrating details of a situation event in accordance with the system of FIG. 1.

FIG. 2 is a block diagram illustrating details of event 40. Event 40 comprises a type 100, a identifier 102, a date 104, a time 106, an expiration 107, a location 108, one or more access levels 109 and one or more event details 110. Type 100 comprises a numeric, alphanumeric or other value for indicating the kind of the event 40. Type 100 may be used to categorize events 40. For example, type 100 may indicate a crime event, an emergency event, a weather event or a traffic event. Type 100 may also indicate more specific information. For example, type 100 may indicate a kidnapping, a car theft, a fire emergency or a rain storm. Type 100 may further comprise multiple indications regarding the type of event 40. For example, type 100 may comprise two indicators, one indicating a crime and the second indicating a kidnapping. While type 100 may be referred to herein as a singular element, multi-element type indications are within the scope of the invention.

Identifier 102 comprises a numeric, alphanumeric or other value for uniquely identifying each event 40 and distinguishing events 40 from each other. For example, identifier 102 may comprise a case number. Date 104 indicates a month, day and year associated with event 40, such as the date the event 40 occurred. Time 106 is a field that may indicate one or more times associated with the reporting time of the incident or time of an event 40. Location 108 comprises one or more indications of the location of the event. For example, location 108 may comprise Dallas, Tex. Location 108 may also be more detailed, such as the northwest corner of the intersection of first and second streets. In general, location 108 may be as detailed as necessary for the particular event 40. For example, a weather related event 40 may only indicate Dallas, Tex. while a traffic accident may have a street intersection as well as city and state information. Expiration 107 comprises an indication of when an event 40 should be deleted as being out of date. Expiration 107 may be configured on a global basis for all events 40 at clearing house 22 or may be set on an event-by-event basis as configured by the administrator associated with clearing house 22 or automatically in response to type 100 of event 40. For example, for crime type events 40 expiration 107 may default to the statute of limitations time for particular types of crimes.

Access levels 109 comprise one or more indications of who may access event 40 and the elements of event 40, such as location 108 and details 110. Access levels 109 are configurable for each event 40 individually. For example, access levels 109 may indicate that members of the public may access information about the victim in details 110 of a kidnapping type event 40, but not be allowed to access any element of murder type events 40 or even know that murder type events 40 exist. For another example, access levels 109 may indicate that public or anonymous users may access only weather and traffic type events 40 while media personnel may access portions of crime type events 40. For a further example, access levels 109 for a particular event 40 may specify that a public subscriber has access to location 108 and date 104, a media subscriber has access to location 108, date 104 and only a description of the suspect from the information in details 110, and a law enforcement subscriber has access to all information. In addition, as access levels 109 may be set on a per-event basis, a particular, high-profile event 40, such as a kidnapping, may be configured release no information to anyone outside the law enforcement community, even though normal kidnappings release some information to the media and the public. For example, per-event access levels 109 may be used to prevent Internet users from accessing web pages related to the high-profile event 40. Access levels 109 may be set by event module 36 and an administrator associated with clearing house 22. In general, access levels 109 may indicate different levels of access to particular elements of event 40 to different types of subscribers.

Details 110 comprise event 40 related information for specific events 40. Details 110 may be customized based on type 100 of event 40 to provide appropriate information. Details 110 may include public bulletins, procedures, warnings, instructions or other pregenerated information related to a specific event 40. For example, a kidnapping event 40 may include a picture and description of the victim, possible suspects, sightings and other kidnapping specific information. For another example, a weather event 40 may include direction, speed and strength of a storm in details 110. Continuing the weather example, a map with escape routes listed may be included in details 110 based on location 108 and the direction of the storm. For a further example, a contact, such as an e-mail address or a subscriber profile 46, may be provided in details 110 so that users who access a particular event 40 and have information related to the particular event 40 may communicate the information to the contact. In general, details 110 may comprise any amount of text, graphics and other data appropriate for a particular event 40 as configured by an administrator associated with clearing house 22. More than one field of details 110 may be used to control access to categories of details or differentiate between information included within notifications 44 based on the identity of a particular subscriber.

Figure 3:
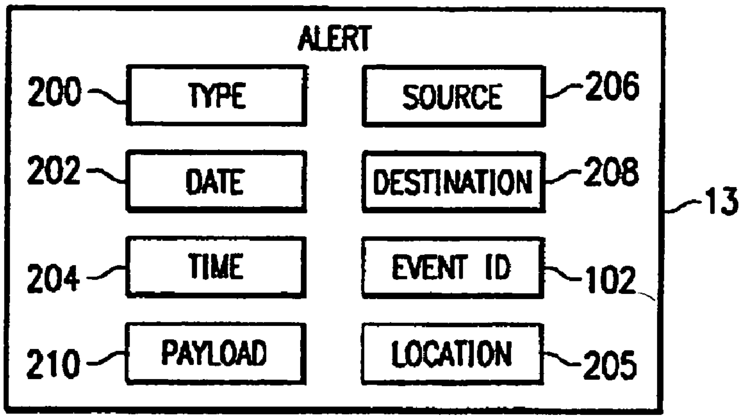
FIG. 3 is a block diagram illustrating details of an alert for updating situation events in accordance with the system of FIG. 1.

FIG. 3 is a block diagram illustrating details of alert 13. Alert 13 may comprise a type 200, a date 202, a time 204, a source 206, a destination 208, event identifier 102 and a payload 210. Type 200 comprises a numeric, alphanumeric or other identifier for indicating the type of alert 13. Similar to type 100, type 200 may be used to categorize alerts 13. For example, type 200 may indicate a crime alert, an emergency alert, a weather alert or a traffic alert. Type 200 may also indicate more specific information. For example, type 200 may indicate a kidnapping, a car theft, a fire emergency or a rain storm. Type 200 may further comprise multiple indications regarding the type of alert 13. For example, type 200 may comprise two indicators, one indicating a crime and the second indicating a kidnapping. While type 200 may be referred to herein as a singular element, multi-element type indications are within the scope of the invention.

Date 202 indicates a month, day and year associated with alert 13, such as the date associated with alert 13. Time 204 is a field that may indicate one or more times associated with the reporting time of the incident or time of an alert 13. Location 205 comprises one or more indications of the location of the event. For example, location 205 may comprise Dallas, Tex. Location 108 may also be more detailed, such as the northwest corner of the intersection of first and second streets. In general, location 205 may be as detailed as necessary for the particular alert 13. For example, a weather related alert 13 may only indicate Dallas, Tex., while a traffic accident may have a street intersection as well as city and state information.

Source 206 comprises a numeric, alphanumeric or other identifier operable to indicate the particular device 12 or server 16 which generated the alert 13. Destination 208 comprises one or more indications of the destination or destinations of alert 13. Alert 13 may be communicated to multiple destinations, such as server 16 and clearing house 22. Alert 12 may optionally include an event identifier 102 to identify a particular event 40 to update.

Payload 210 comprises one or more items of information regarding the details of alert 13. Each type 200 of alert 13 may comprise distinct payload items based on type 200 of alert 13. Payload 210 may be customized based on type 200 of payload 210 to provide appropriate information. For example, a kidnapping event 40 may include a picture and description of the child, possible suspects, sightings and other kidnapping specific information. For another example, a weather event 40 may include direction, speed and strength of a storm. For example, a map with escape routes may be included in payload 210 based on officer knowledge. In general, payload 210 may comprise any number of text, graphics and other information appropriate for a particular event 40 as configured by an administrator associated with device 12. Typically, payload 210 is used to populate details 110 of event 40 with information. For a further example, a contact, such as an e-mail address or a subscriber profile 46, may be provided in payload 210 so that a responsible officer may receive information from users who access the particular event 40 created or updated in response to alert 13.

In operation, type 200 may be used by server 16 and modules 36 and 38 when handling alerts 13. For example, server 16 may consider type 200 with respect to criteria 42. For another example, event module 36 may use type 200 in determining how to generate events 40.

Figure 4:
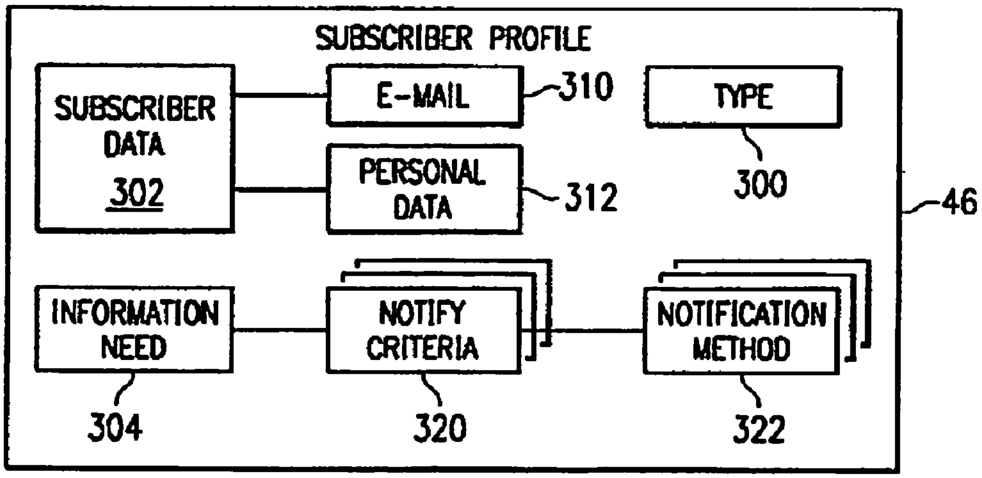
FIG. 4 is a block diagram illustrating details of a subscriber profile in accordance with the system of FIG. 1.

FIG. 4 is a block diagram illustrating details of subscriber profile 46. Profile 46 comprises a type 300, subscriber data 302 and a subscriber information need 304. Type 300 comprises a numeric, alphanumeric or other identifier for indicating the type of subscriber associated with profile 46. Type 300 may indicate a law enforcement subscriber, a media subscriber, a public subscriber, a emergency subscriber, a weather agency subscriber and other types of subscribers.

Type 300 may be used with access levels 109 to determine what events 40 and elements of events 40, such as details 110, location 108, date 104 and time 106, may be accessed by particular subscribers. For example, a subscriber from the media may have complete access to weather and traffic type events 40, partial access to crime events 40 and no access to officer status events 40. For another example, a public subscriber, who may be using a free subscription, may have complete access to weather and traffic type events 40, partial access to sex offender related events 40, and no access to other types of events 40. In general, access levels 109 may be configured to allow access to some, all or none of date 104, time 106, location 108 and details 110 based on subscriber type 300.

Type 300 may further comprise multiple indications regarding the type of subscriber. For example, type 300 may comprise two indicators, one indicating a news media subscriber and the second indicating a pricing plan. While type 300 may be referred to herein as a singular element, multi-element type indications are within the scope of the invention. For example, a major news service may sign up reporters for an unlimited use subscription, while a smaller news service may sign up for a fee for use model. As type 300 may accommodate multiple indicators, any suitable combination of indicators may be used to indicate a pricing structure for a particular subscriber. For example, type 300 may indicate that some event types 100 are free to the subscriber, other event types 100 are fee-for-service and still other event types 100 are unlimited access for a fixed fee. For another example, access to all events 40 may be free, while charging for the ability to enter events 40. In general, fees may be charged to subscribers on an annual basis or other period, and may calculated based on a flat rate, a number of accesses during the billing period, or based on the number of individual users, clients 20, devices 12, or servers 16 associated with a particular subscriber such as a police department or media outlet. The above examples of fees charged for access to system 10 are not intended to limit the scope of any method of accounting or billing for fee collection from subscribers to system 10. Other means of generating revenue for system 10 such as selling web site advertisement space or displaying links to commercial web sites my be utilized.

Subscriber data 302 comprises information about the subscriber in subscriber profile 46. More specifically, subscriber data 302 may comprise an electronic mail address 310 and personal data 312. Personal data 312 may comprise name, address, phone number, fax number and other subscriber information associated with subscriber profile 46. In general, data 302 may comprise any suitable information about the subscriber associated with profile 46.

Information need 304 indicates events 40 which the subscriber associated with profile 46 is interested in and comprises one or more notification criteria 320 and one or more notification methods 322. Each notification criteria 320 comprises one or more elements of events 40 indicating events 40 which the subscriber should receive notifications 44 about. More specifically, each criteria 320 may indicate one or more items from events 40, such as date, 104, time 106, location 108 and information in details 110, that indicate events 40 of interest to the associated subscriber. For example, criteria 320 may specify only events 40 with associated graphic images. Criteria 320 may also allow for the Boolean combination of items from events 40, such as AND, OR, XOR and NOT, and text matching of items from events 40. For example, a particular criteria 320 may indicate that a subscriber is interested in kidnapping events 40 in the Dallas, Tex., location 108 that occur after Jan. 1, 2000, in the date 104 and involving "Jane Doe" in as a victim listed in details 110. For another example, a daily commuter may indicate an interest in events 40 having a type 100 of traffic event in the Dallas, Tex., location 108 and freeway Interstate 620 in details 110. For an additional example, criteria 320 may indicate a distance for use with location 108, such as all events 40 with a location 108 within five miles of a particular street address. Continuing the previous example, a subscriber could request all traffic events 40 occurring between two addresses, such as a home and work address, in order to monitor current traffic conditions using criteria 320. Further continuing the previous example, a subscriber with a GPS system and a wireless connection to network 14 could request real-time traffic updates based on the subscriber's current location and use that information to plot escape routes on an in-car navigation system. In general, any combination of items such as type 100, date 104, time 106, location 108 and information in details 110 may be indicated in criteria 320. Further, each profile 46 may include multiple criteria 320 indicating various different information needs. Profiles 46 may also be manually or automatically processed to determine a permit access and level based on type 300.

Notification method 322 comprises an indication of how to communicate notifications 44 generated in response to criteria 320 regarding events 40. Typically, a notification method 322 is associated with each criteria 320, but multiple criteria may use a single method 322. More specifically, method 322 indicates whether electronic mail, traditional mail, facsimile transmission, an electronic page or other delivery method should be used for communicating notifications 44 to the subscriber associated with profile 46. Multiple methods 322 may be associated with a single criteria 320, such as when a subscriber desires to be notified by both electronic mail and an electronic page.

Figure 5:
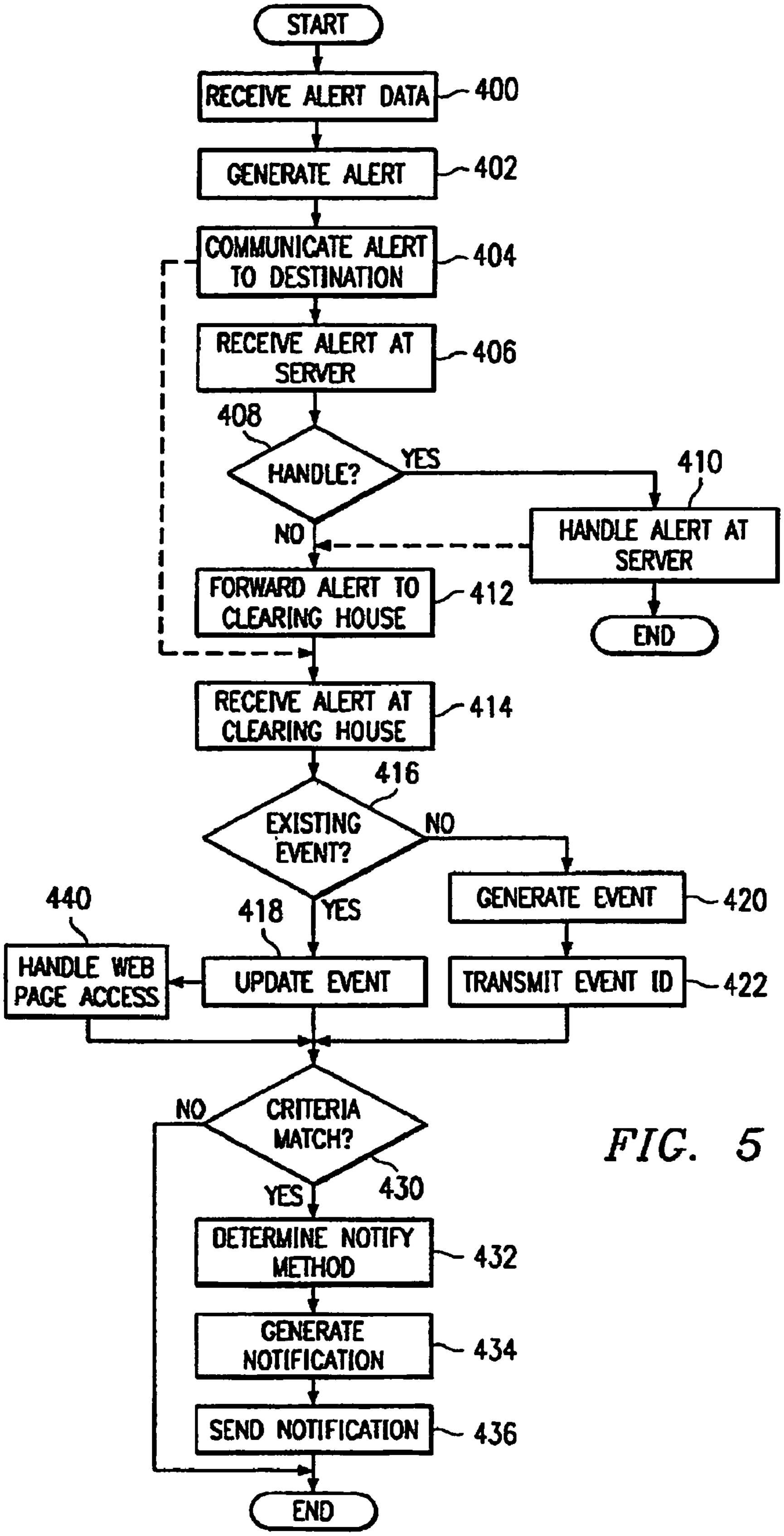
FIG. 5 is a flowchart indicating a method for generating alerts and updating events in accordance with the system of FIG. 1.

FIG. 5 is a flowchart indicating a method for alert 13 generation and event 40 updating. The method begins at step 400 where alert data is received at device 12 or server 16. The alert data may be received by a human operator entering the information or by some other method. Next, at step 402, alert 13 is generated using the received alert information. More specifically, type 200 is assigned to alert 13 by the operator or using the alert information, date 202 and time 204 are set, source 206 is set to identify the device 12 or server 16 generating alert 13, destination 208 is set to server 16 and/or clearing house 22 by the operator and/or based on type 200, and payload 210 is set using the alert information based on the type 200 of alert 13. An event identifier 102 may also be included with alert 13 to update a particular existing event 40 at server 16 or clearing house 22. Then, at step 404, alert 13 is communicated to the one or more destinations indicated in destination 208.

Proceeding to step 406, alert 13 is received at server 16. Alert 13 may also be directly communicated to clearing house 22 and the method continued at step 414. Next, at decisional step 408, server 16 determines whether alert 13 is to be handled at server 16 or forwarded to clearing house 22. If alert 13 is to be handled at server 16, then the YES branch of decisional step 408 leads to step 410. At step 410, alert 13 is handled at server 16. More specifically, based on criteria 42 and alert 13, an event 40 may be generated or updated at server 16, alert 13 may be discarded or further alerts 13 may be generated. The further alerts 13 may be handled directly at server 16 and/or forwarded to clearing house 22.

If alert 13 is to be forwarded to clearing house 22, then the NO branch of decisional step 408 leads to step 412. At step 412, server 16 forwards alert 13 to clearing house 22. Server 16 may also change alert 13 based on criteria 42 before forwarding alert 13 to clearing house 22. Then, at step 414, alert 13 is received at clearing house 22.

Next, at decisional step 416, clearing house 22 determines whether alert 13 relates to an existing event 40 based on identifier 102 in alert 13. If alert 13 relates to an existing event 40 then the YES branch of step 416 leads to step 418. At step 418, the appropriate event 40 is updated using information in alert 13, such as payload 210. For example, an existing kidnapping event 40 may be updated with recent sightings of the victim.

If alert 13 is unrelated to existing events 40, then the NO branch of step 416 leads to step 420. At step 420 a new event 40 is generated based on type 200, date 202, time 204, location 205 and payload 210 of alert 13. Access levels 109 are also set at step 420 based on type 200. A unique event identifier 102 is also assigned to the newly generated event 40. Next, at step 422, the new event identifier 102 is communicated to one or more servers 16 and/or one or more devices 12. The new event identifier 102 is communicated to servers 16 and devices 12 to allow for the updating of events 40. Servers 16 and/or devices 12 may store the event identifier 102 and a subset of the associated event information so as to be able to easily generate new alerts 13 to update the new event 40. For example, servers 16 may store event identifiers 102 so that alerts 13 received from associated devices 12 may be changed to include the appropriate event identifier 102.

At either of step 418 or 420 for events 40, expiration time 107 may be checked to determine if events 40 are to be expired and deleted by event module 36.

Proceeding to decisional step 430, notify module 38 determines whether one or more events 40 meet notify criteria 320 in profiles 46. Module 38 may check events 40 for matches after events 40 have been generated or updated based on alerts 13. Module 38 may also perform this check at other times, such as simultaneously with the processing of alerts 13 at clearing house 22. Module 38 also determines whether the subscriber has access to matched events 40, based on type 300 of subscriber and access levels 109 of matched events 40. Alternatively, module 38 may not search events 40 for matches if the subscriber does not have access to the events. More specifically, module 38 compares information in type 100, identifier 102, date 104, time 106, location 108 and details 110 to information provided in criteria 320. Criteria 320 may specify any of the information in events 40. For example, the geographic information in location 108 may be used to find events 40 in a particular ZIP code, city, county, state, region or other geographic feature. For another example, criteria 320 may specify events 40 associated with armed robbery in type 100 by female suspects in details 110 in the Clark county area in location 108. If no events 40 meet criteria 320, then the NO branch of decisional step 430 is followed and the method ends.

If one or more events 40 meet criteria 320, then the YES branch of step 430 leads to step 432. At step 432, module 38 determines the method of notification for each met criteria 320. Then, at step 434, notification 44 is generated by module 38 as appropriate for the notification method. For example, an electronic mail notification method results in the generation of an appropriate electronic mail including accessible information about the matched event 40. Then, at step 436, notification 44 is communicated to the subscriber associated with the profile 46 with matched criteria 320. Notification 44 may include all or a portion of the information in the matched event 40. Criteria 320 may specify which information to include in notification 44. Access levels 109 associated with the matched event 40 may also limit the information included in notification 44. In addition, module 38 may be configured to return differing amounts of information associated with the matched event 40 based on event 40 itself, the delivery method 322 and/or other data. For example, notification 44 may include all of type 100, identifier 102, date 104, time 106, location 108 and details 110 for law enforcement subscribers while including only type 100 and date 104 to media subscribers. For another example, notification 44 may include only type 100 and location 108 based on particular criteria 320. For a further example, only type 100 and date 104 may be included when notification method 322 indicates an alphanumeric pager or a text-enabled cell phone.

For another example, the method of notification at step 432 may comprise the updating of the Internet web site associated with clearing house 22. In this example, step 434 would comprise the generation of one or more hypertext markup language (HTML) or other web pages based on events 40 matched to the profile 46 associated with the web site. More specifically, profile 46 for the web site may indicate that all events 40 having of multiple types 100 be added to the web site, such as all traffic and weather events 40 and certain types 100 of crimes. Many or all of the events 40 supported at clearing house 22 may be provided over the web site. Access to events 40 provided through the web site may be continue to be controlled by access levels 109. More specifically, access levels 109 may be used to control which elements, type 100, identifier 102, date 104, time 106, location 108 and details 110, of events 40 to present in response to web page requests. For example, a web page with all elements of event 40 may be presented to a law enforcement subscriber while a web page with only type 100 and location 108 is presented to a media subscriber. Step 436 may then comprise publishing the generated web pages to the Internet.

Returning to steps 418 and 422, the method may also proceed to step 440. At step 440, communication server 34 handles web page access. More specifically, the web server portion of communication server 34 handles HTTP requests from clients 20. The web page accesses may comprise page retrieval and search requests by users at clients 20. Communication server 34 provides web pages generated at steps 432, 434 and 436 to users at clients 20 over networks 14 and 18. Communication server 34 also supports searches on the web pages at the web site by users using web browsers at clients 20 and enforces access levels 109 associated with events 40. For example, a user may search for all traffic events 40 in a particular ZIP code. For another example, a user may log-in to gain increased access to restricted events 40, such as events 40 not or only partially available publicly.

Figure 6:
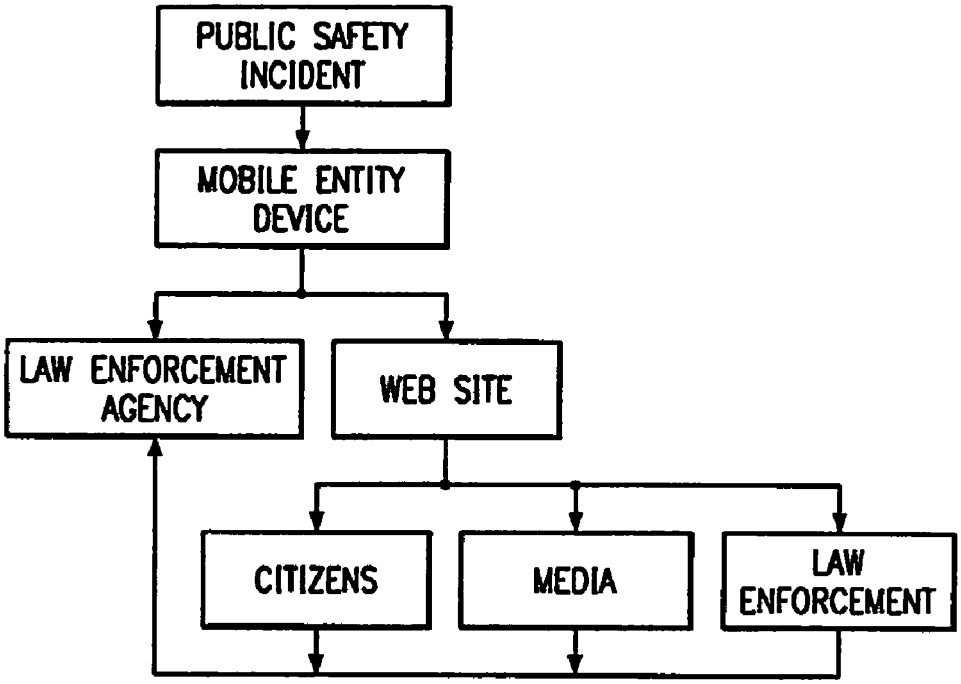
FIG. 6 is a block diagram illustrating an information flow path between a law enforcement agency and others in accordance with the system of FIG. 1.

FIG. 6 is a block diagram illustrating an information flow path between a law enforcement agency and others. FIG. 6 illustrates that information regarding a public safety incident may be entered at mobile entity device 12. Clearing house 22 then provides a forum for distributing information about public safety events 40 to the responsible law enforcement agency. As clearing house 22 is also operable to publish public safety event 40 information to a web site, information may be distributed to a wide variety of citizens, media personnel and other law enforcement groups and personnel. By increasing the availability of public safety incident related information to citizens, the media and other law enforcement personnel and groups, the chance of receiving useful information regarding public safety incidents by the responsible law enforcement agency is increased. Thus, the advantages of increasing the solution rate of crimes and decreasing the number of open cases may be realized. A further benefit of decreased crime may be realized due to increased participation in law enforcement by non-law enforcement personnel.

Figure 7:
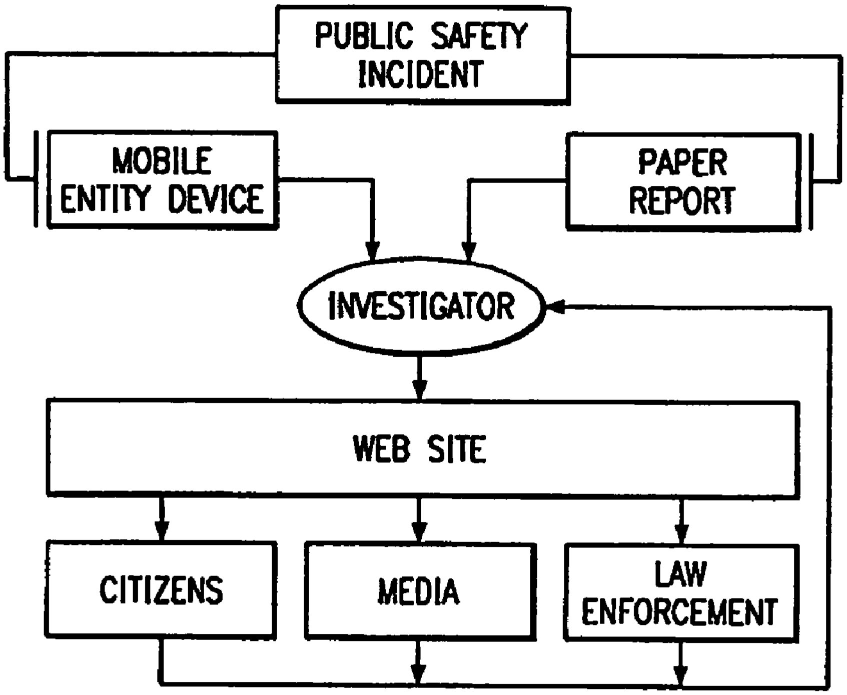
FIG. 7 is a block diagram illustrating an information flow path between a investigator and others in accordance with the system of FIG. 1.

FIG. 7 is a block diagram illustrating an information flow path between a investigator and others. FIG. 7 illustrates that information regarding a public safety incident may be electronically entered at devices 12 or provided to an investigator by traditional paper reports. The investigator may then examine the available information about the public safety incident in electronic and/or paper form. The investigator's examination may include providing additional information about the public safety incident based on the experience, training and investigations of the investigator. The available information about the public safety incident may then be posted to the web site using clearing house 22. Citizens, media and law enforcement groups may then access the web site and contact the investigator with information related to the public safety incident. For example, the contact information in details 110 of an event 40 related to the public safety incident may be used to contact the investigator.

It should also be recognized that other changes, substitutions and alterations are also possible without departing from the spirit and scope of the present invention, as defined by the following claims.

What is claimed is:

1. A method for situation tracking comprising:

receiving an alert at a server associated with a public safety subscriber;

comparing the alert to criteria;

determining whether to modify the alert based on the criteria;

determining whether to communicate the alert to a clearing house based on the criteria;

receiving the alert at the clearing house;

determining a public safety event based on the alert, the public safety event having a first set of accessible information associated with a first access level and a second set of accessible information associated with a second access level distinct from the first access level;

selecting a first portion of the public safety event based on a first subscriber profile associated with a first subscriber and the first access level associated with the public safety event, wherein the first portion includes the first set of accessible information and wherein the first access level is associated with the first subscriber profile;

generating a first notification including the first portion in response to the first subscriber profile and the public safety event;

determining a first destination for the first notification based on a first notify criteria of the subscriber profile and at least one element of the first portion;

selecting a second portion of the public safety event based on a second subscriber profile associated with a second subscriber and the second access level associated with the public safety event, the second access level is associated with the second subscriber profile and wherein the second portion includes the second set of accessible information;

generating a second notification including the second portion in response to the second subscriber profile and the public safety event; and determining a second destination for the second notification based on a second notify criteria of the subscriber profile and at least one element of the second portion.

2. The method for situation tracking according to claim 1, wherein determining whether to modify the alert comprises:

determining a related alert based on the criteria, the related alert being related to the alert;

generating an updated alert based on the related alert and the alert; and wherein the alert is replaced with the updated alert, and determining whether to communicate the alert to the clearing house is determined based on the updated alert instead of the alert.

3. The method for situation tracking according to claim 2, wherein the public safety subscriber is selected from the group consisting essentially of a law enforcement agency and a fire department and wherein generating the updated alert further comprises receiving information for the updated alert from a data entry device.

4. The method for situation tracking according to claim 1, wherein selecting the first portion comprises determining the first set of accessible information based on a type associated with the first subscriber profile, the type indicating whether particular portions of information concerning the public safety event are available to the first subscriber.

5. The method for situation tracking according to claim 1, wherein determining the public safety event comprises:

generating the public safety event in response to the alert being unrelated to an existing public safety event at the clearing house; and updating the public safety event based on the alert in response to the public safety event already existing at the clearing house.

6. The method for situation tracking according claim 1 and further comprising determining an alert type associated with the alert at the clearing house and wherein the public safety event comprises a type indication, a location indication, a time indication, a date indication, an access level indication and event details, the access level indication indicating the information accessible by a subscriber.

7. The method for situation tracking according to claim 1, wherein the first subscriber profile comprises a notify criteria, the notify criteria comprising a geographic distance around a first location indication, wherein the public safety event further comprises a second location indication, and wherein generating the first notification comprises determining whether the second location indication is within the geographic distance of the first location indication.

8. The method for situation tracking according to claim 1 further comprising:

wherein the public safety event is determined at the server;

determining, at the server, an information need with a third subscriber profile associated with a third subscriber, the information need comprising an item of interest to the third subscriber;

comparing, at the server, the information need to the public safety event; and generating, at the server, a third notification to the third subscriber based on the comparison.

9. The method for situation tracking according to claim 1, wherein selecting the first portion comprises generating a web page based on the public safety event and wherein the first portion further comprises a destination indication associated with a web site, the web site being associated with the public safety event and including the first portion.

10. The method for situation tracking according to claim 1, wherein generating the first and second notification respectively comprise generating at least one electronic mail message and wherein the first and second destination respectively comprise an electronic mail address.

11. The method for situation tracking according to claim 1, wherein the first subscriber profile comprises a generic profile or a media generic profile.

12. The method for situation tracking according to claim 11, wherein the generic profile comprises a media generic profile.

13. The method for situation tracking according to claim 1, wherein the public safety event is related to an illegal activity and further comprising expiring the public safety event based on a statute of limitations associated with the illegal activity.

14. The method for situation tracking according to claim 1, wherein the criteria indicates that alerts related to a crime are compared to at least one existing public safety event and further comprising modifying the alert based on the existing public safety event to include information from the existing public safety event.

15. A method for situation tracking according to claim 1, wherein receiving the alert at the clearing house comprises receiving the alert over a wireless data communications system.

16. The method for situation tracking according to claim 1, wherein the public safety event further comprises contact information associated with a law enforcement officer responsible for the public safety event.

17. The method for situation tracking according to claim 16, wherein the entity responsible for the public safety event is a law enforcement officer.

18. A system for situation tracking comprising:

a computer readable storage medium;

an application stored in the computer readable storage medium and operable to:

receive an alert at a server associated with a public safety subscriber;

compare the alert to criteria;

determine whether to modify the alert based on the criteria;

determine whether to communicate the alert to a clearing house based on the criteria;

receive the alert at the clearing house;

determine a public safety event based on the alert, the public safety event having a first set of accessible information associated with a first access level and a second set of accessible information associated with a second access level distinct from the first access level;

select a first portion of the public safety event based on a first subscriber profile associated with a first subscriber and the first access level associated with the public safety event, wherein the first portion includes the first set of accessible information and wherein the first access level is associated with the first subscriber profile;

generate a first notification including the first portion in response to the first subscriber profile and the public safety event;

determine a first destination for the first notification based on a first notify criteria of the subscriber profile and at least one element of the first portion;

select a second portion of the public safety event based on a second subscriber profile associated with a second subscriber and the second access level associated with the public safety event, the second access level is associated with the second subscriber profile and wherein the second portion includes the second set of accessible information;

generate a second notification including the second portion in response to the second subscriber profile and the public safety event; and determine a second destination for the second notification based on a second notify criteria of the subscriber profile and at least one element of the second portion.

* * * * *

UNITED STATES PATENT AND TRADEMARK OFFICE

CERTIFICATE OF CORRECTION

PATENT NO. : 7,406,507 B2
APPLICATION NO. : 11/012370
DATED : July 29, 2008
INVENTOR(S) : Robert L. Piccioni It is certified that error appears in the above-identified patent and that said Letters Patent is hereby corrected as shown below:

Column 2, line 61, "Server 18" should be changed to -- Server 16 --.

Signed and Sealed this

Eleventh Day of May, 2010

David J. Kappos

David J. Kappos
*Director of the United States Patent and Trademark Office*